United States Patent

[11] 3,545,603

| [72] | Inventor | Rubin Warsager<br>72 Tuddington Road, West Orange,<br>Newark, New Jersey 07052 |
|---|---|---|
| [21] | Appl. No. | 775,789 |
| [22] | Filed | Nov. 14, 1968 |
| [45] | Patented | Dec. 8, 1970 |

[54] EYEGLASS CASE
2 Claims, 3 Drawing Figs.

[52] U.S. Cl. .................................................. 206/5,
 206/47
[51] Int. Cl. ...................................................... A45c 11/20,
 B65d 79/00
[50] Field of Search ........................................... 206/56(M),
 5; 150/1

[56] References Cited
UNITED STATES PATENTS
1,670,343  5/1928  Clemens ........................ 206/56(M)UX
3,373,866  3/1968  Will ............................... 206/56(M)UX Primary Examiner—Joseph R. Leclair
Assistant Examiner—John M. Caskie
Attorneys—Albert C. Johnston, Robert E. Isner, Lewis H. Eslinger and Alvin Sinderbrand ABSTRACT: An eyeglass case having a relatively large opening at one end for the insertion of eyeglasses, and a smaller opening spaced from the relatively large opening through which an eyeglass cleaning cloth may be extracted when the cloth is located at the smaller opening.

PATENTED DEC 8 1970
3,545,603
Fig. 1.
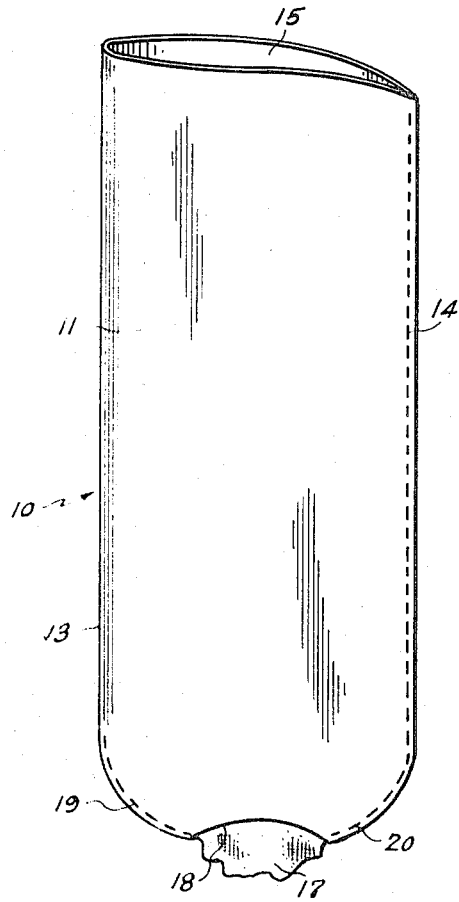
Fig. 2.
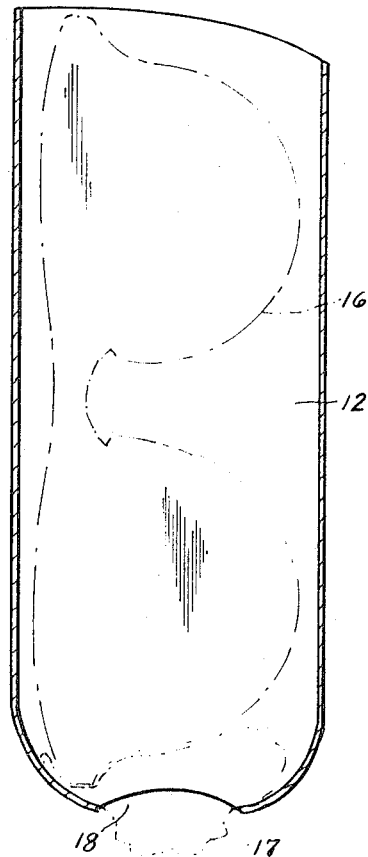
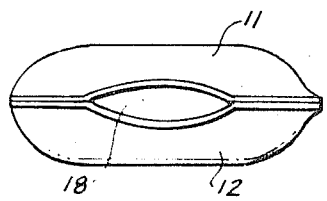
Fig. 3.
INVENTOR.
RUBIN WARSAGER
BY
ATTORNEY

EYEGLASS CASE

BACKGROUND OF THE INVENTION

It is a well-known fact that eyeglass cases have been used for many years. Generally, when a person is supplied with a new pair of eyeglasses, a case for storing the glasses is given which serves to protect the eyeglasses from becoming scratched or broken. Other objects, such as polished glass lenses, prisms, precision metallic objects and other devices are also stored in a protective case.

A cleaning cloth is usually included in the storage case which, of course, is a relatively small, soft cloth which cleans the eyeglasses without any abrasive action. When a cloth is inserted in an eyeglass case for storage, it is generally forced by the eyeglasses to the closed end of the eyeglass case which is in the form of a pouch. Anyone who has tried to remove a cleaning cloth from the lower recess of the case realizes the frustration which occurs in this attempt. The eyeglass cases are made slightly longer than a pair of eyeglasses and a person's fingers of normal size aren't long and narrow enough to extend into the farthest recess of the eyeglass case to grip the cleaning cloth. Most people must then seek the aid of a tool, such as a long rod or a pliers. Even with these aids, it is not a simple matter to grip the cloth and it is most inconvenient to extract the same.

SUMMARY OF THE INVENTION

I have discovered that by placing a small opening in the closed end portion of the eyeglass case, the cleaning cloth can be removed from the case quite simply and without having to resort to using tools.

Basically, eyeglass cases are supplied in two types which, for convenience, will be referred to as "pouch" type and "hinge" type. The pouch type is, as the name implies, open at one end only and the cleaning cloth and eyeglasses are inserted into the open end of the pouch. The "hinge" type case is opened like an oyster shell, and the eyeglasses and cloth are placed inside the case, which is then closed by pressing the hinged portions together.

My invention is meant to be applied to the pouch-type cases for use with eyeglasses, sun glasses and other objects, however, it can be applied to other cases; therefore, any limitations as to use of the case are not to be inferred.

In using the eyeglass case of this invention, one places a cleaning cloth into the large open end of the case and thereafter the insertion of eyeglasses into the case may force the cloth into the opposite end of the case. When the foregoing occurs, the cloth extends outwardly from a relatively small opening in the bottom end of the eyeglass case and may be gripped by the fingers for extraction from the case by a simple motion so as to be available to clean the eyeglasses.

It is an object of this invention to provide a new and improved storage case which permits the facile extraction of a cleaning cloth therefrom.

It is a further object of this invention to provide an inexpensive storage case which has no moving parts and will permit the extraction of a cleaning cloth.

It is still a further object of this invention to provide a "pouch" storage case which, in addition to the usual relatively large opening at one end for the insertion and removal of an object, is provided with a relatively restricted opening at a point spaced from the large opening, for permitting the removal therethrough of a cleaning cloth without unusual manual dexterity and without the use of tools.

The above, and other objects, features and advantages of the invention, will be apparent in the following detailed description of an illustrative embodiment of the invention which is to be read in connection with the accompanying drawing, wherein:

FIG. 1 is a perspective view of an eyeglass case according to this invention with a cleaning cloth projecting from an end of the case for easy removal therefrom;

FIG. 2 is a view of the eyeglass case with a wall thereof being broken away to show eyeglasses and a cleaning cloth therein in phantom lines; and FIG. 3 is an end view of the eyeglass case.

Referring to the drawing in detail, it will be seen that an eyeglass case 10 according to the invention is in the form of an elongated pouch of leather, plastic cloth, or other suitable material. The pouch-like case 10 has sidewalls 11 and 12 which are secured together along their longitudinal edge portions. As shown, sidewalls 11 and 12 may be formed of a one-piece blank which is folded upon itself, in which case walls 11 and 12 are integral at the fold, as at 13 (FIG. 1), and are further joined at the opposite longitudinal edge portions, for example, by stitching 14 as shown, or by a heat-sealed or cemented seam.

The walls 11 and 12 are free of each other across one end of case 10, for example, the upper end of the case as shown, to define a relatively large opening 15 through which eyeglasses 16 and a cleaning cloth 17 may be inserted and removed in the usual manner. It will be apparent that, if the eyeglasses 16 are repeatedly removed and reinserted with the cloth 17 in the case 10, the tendency will be to progressively drive the cloth 17 toward the lower end of the case, that is, toward the end remote from opening 15. Eventually, the cloth 17 will not be accessible through opening 15.

According to this invention, the eyeglass case 10 is provided with an additional opening 18 at the end thereof remote from opening 15. The additional opening 18 is preferably substantially smaller than the opening 15 so that the eyeglasses 16 cannot fall therethrough. As shown, opening 18 may open approximately one-half of the lateral dimension of case 10 and be defined between end seams 19 and 20 which respectively extend from fold 13 and from side seam 14 to join together walls 11 and 12 at portions of the ends thereof remote from opening 15. Preferably, the edges of opening 18 are concave, as shown, so that, when cloth 17 is driven toward the end of case 10 remote from opening 15, such cloth can be easily grasped and extracted through opening 18. The opening 18 can be located at any position between the longitudinally spaced ends of the case, if desired.

The edge of opening 18 is preferably smooth to offer minimal resistance to the withdrawal of cloth 17 therethrough. Of course, if the cloth 17 is not driven toward opening 18 by the insertion of glasses 16 into case 10, then the cloth can be removed from the case through opening 15.

Although a specific embodiment of the invention has been described in detail herein with reference to the accompanying drawing, it is to be understood that the invention is not limited to that precise embodiment, and the various changes and modifications may be effected therein by one skilled in the art without departing from the scope or spirit of the invention as defined in the appended claims.

I claim:

1. In combination with eyeglasses and a cleaning cloth therefor, a storage case for said eyeglasses and cloth comprising an elongated pouch having a relatively large opening at one end thereof for the reception of said cleaning cloth and eyeglasses, and a relatively smaller opening spaced along said pouch from said relatively large opening, said relatively smaller opening being smaller than the width of said eyeglasses and large enough to permit removal of said cleaning cloth therethrough when the cloth is displaced within the pouch from said one end thereof.

2. The combination according to claim 1, in which said smaller opening is located in the end of said pouch opposite said one end having the large opening, and said smaller opening extends only partially across the width of said pouch.